Figure 1:
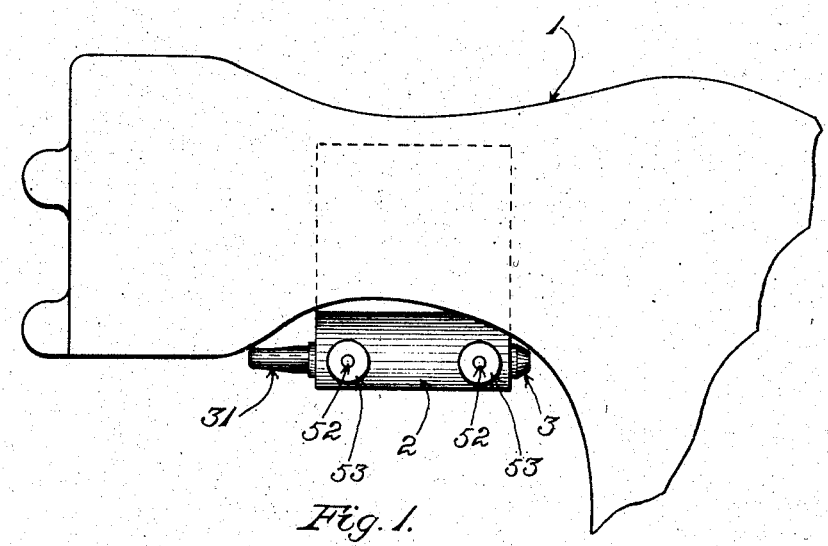

No. 786,774. PATENTED APR. 4, 1905.
F. W. MERRICK.
THREAD WAXING DEVICE FOR SEWING MACHINES.
APPLICATION FILED MAY 7, 1904.

2 SHEETS—SHEET 1.

Witnesses:
Oscar F. Hill
Edith J. Anderson.

Inventor:
Frank W. Merrick
By Macleod Calver & Randall
Attorneys.

No. 786,774. PATENTED APR. 4, 1905.
F. W. MERRICK.
THREAD WAXING DEVICE FOR SEWING MACHINES.
APPLICATION FILED MAY 7, 1904.

2 SHEETS—SHEET 2.

Witnesses:
Oscar F. Hill
Edith J. Anderson

Inventor:
Frank W. Merrick
By Macleod Calver & Randall
Attorneys.

No. 786,774.

Patented April 4, 1905.

UNITED STATES PATENT OFFICE.

FRANK W. MERRICK, OF BOSTON, MASSACHUSETTS.

THREAD-WAXING DEVICE FOR SEWING-MACHINES.

SPECIFICATION forming part of Letters Patent No. 786,774, dated April 4, 1905.

Application filed May 7, 1904. Serial No. 206,840.

*To all whom it may concern:*

Be it known that I, FRANK W. MERRICK, a citizen of the United States, residing at Boston, in the county of Suffolk, State of Massachusetts, have invented a certain new and useful Improvement in Thread-Waxing Devices for Sewing-Machines, of which the following is a specification, reference being had therein to the accompanying drawings.

My invention relates to thread-waxers for sewing-machines, and more especially to the means which is employed in connection therewith for stripping the excess of wax from the thread and smoothing the latter and in some instances for packing the thread-passage or thread-passages in connection with the wax-pot in order to prevent escape of wax from the latter through such passage or passages.

The invention consists in novel stripping or packing or packing and stripping devices and in a novel construction of thread-waxer embodying such devices. It is customary to employ in thread-waxers for stripping or for packing or for packing and stripping a piece of rubber formed with a hole therethrough, through which the thread is extended, the said piece of rubber occupying a socket within which it is subjected to compression, so as to press together the portions thereof which surround the said hole, and thereby cause the thread within the latter to be squeezed tightly. The compression usually is effected by means of a screw-plug fitting within the socket and having a central longitudinal thread-passage in line with the hole in the rubber. By screwing the plug in or out, so as to compress the rubber more or less tightly, the action of the rubber upon the thread may be regulated. This construction has certain drawbacks, among which are the following: In course of time the piece of rubber becomes unfit for further service and must be removed and replaced by a fresh one. The removal of the old piece of rubber from the socket is not always readily effected, however, inasmuch as it usually sticks firmly in place and can be extracted only fragment by fragment and with considerable trouble and loss of time. Similar difficulty is experienced when other packing material than rubber is employed. When the rubber or other packing is compressed within the socket by means of the screw-plug, its peripheral portions engage with the screw-thread which is formed in the interior surface of the wall of the socket. Such engagement prevents the packing from expanding properly when the pressure of the screw-plug is relieved by unscrewing the latter. Consequently the tension of the thread as it leaves the wax-pot cannot be adjusted or regulated to a nicety by reducing the degree of its compression by the packing.

Important objects of my invention are to obviate the foregoing drawbacks by providing a construction by means of which the removal and replacement of the packing shall be facilitated and in which there shall be no tendency to restrain the packing from expanding when the degree of the compression of the same is reduced.

I have shown the invention in the accompanying drawings, in which—

Figure 2:
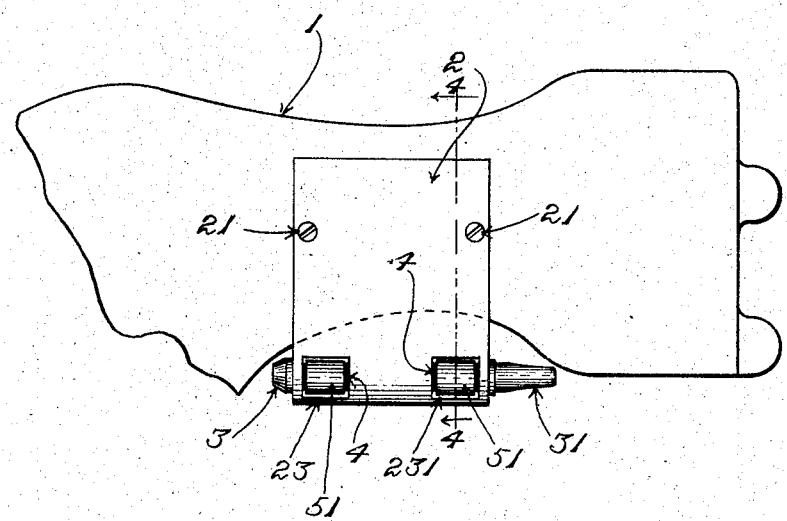
Figure 3:
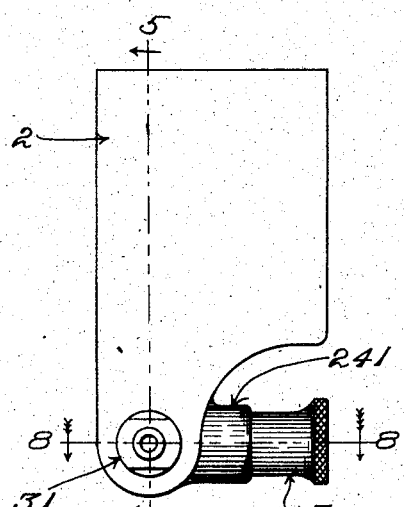
Figure 4:
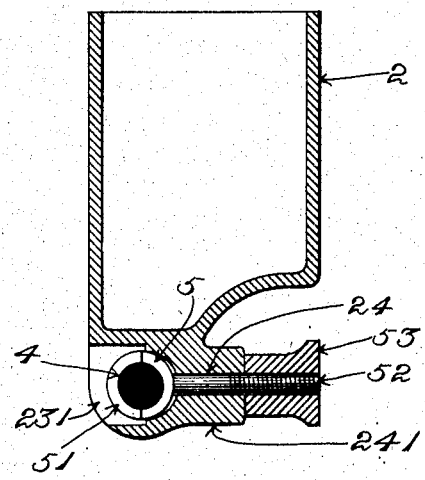
Figures 5, 8:
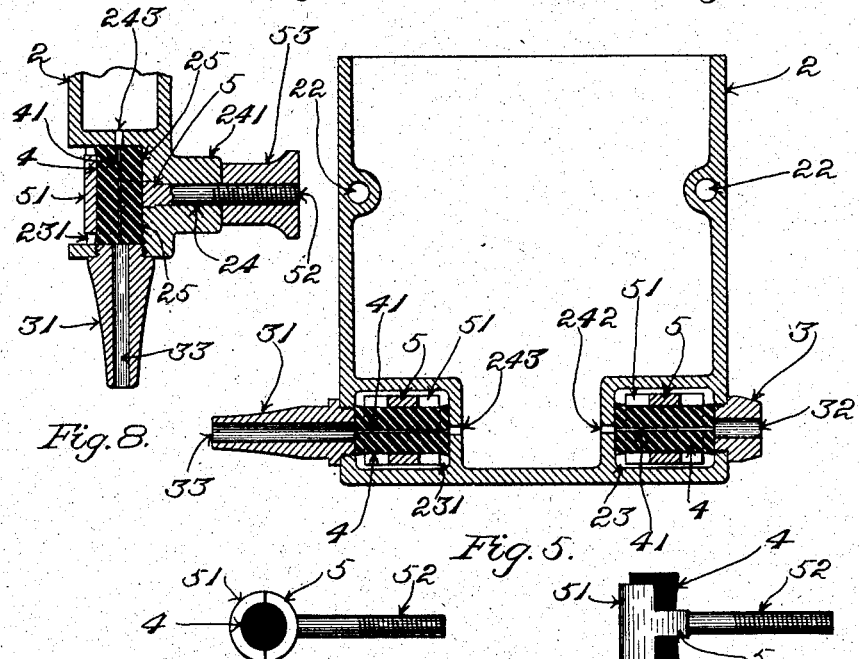
Figures 6, 7:
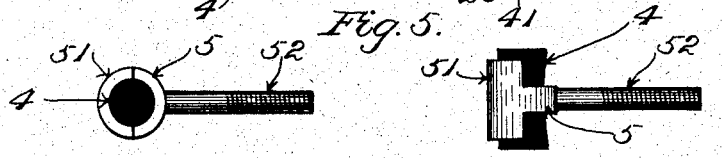

Figure 1 shows in front elevation the arm or gooseneck of a sewing-machine with the invention applied thereto. Fig. 2 shows the same in rear elevation. Fig. 3 shows the thread-waxer detached in end elevation. Fig. 4 is a view of the thread-waxer in vertical transverse section on the plane indicated by the dotted line 4 4 in Fig. 2. Fig. 5 is a view showing the thread-waxer in longitudinal section on the vertical plane indicated by the dotted line 5 5 of Fig. 3. Fig. 6 shows in side elevation, detached, the clip embodying one portion of my invention and the piece or block of compressible material held thereby. Fig. 7 shows the parts of Fig. 6 in plan. Fig. 8 is a view of a portion of the thread-waxer in horizontal section on the plane indicated by the dotted line 8 8 in Fig. 3.

Having reference to the drawings, the arm or gooseneck of a sewing-machine is designated 1 in Figs. 1 and 2, 2 being a wax-pot, which is conveniently secured in connection therewith—as, for instance, by means of screws 21 21, Fig. 2, having the stems thereof extended through holes 22 22, Fig. 5, which are formed within the end walls of the wax-pot.

3 31 are guide-tubes which are secured in holes that are formed in the opposite end walls of the wax-pot, the said holes being threaded or tapped and the portions of the guide-tubes which enter the holes being threaded to screw into the same. Within the casing or shell of the wax-pot at opposite ends of an intermediate portion of the wax-containing chamber and exterior to the said intermediate portion are formed sockets 23 231, Figs. 2, 4, and 5, to receive the pieces 4 4 of packing and stripping material. The precise material which is employed may vary in practice. Rubber, felt, and the like compressible and more or less resilient substances are suitable for the purpose. In the present instance rubber is indicated as employed; but I do not necessarily limit myself thereto. The sockets are open at one side of the wax-pot, in this instance at the rear thereof, while at the front thereof they are closed by portions of the casing or shell, through each of which portions a hole 24, Fig. 4, extends to the front side of the wax-pot through a boss 241. At the inner ends of the sockets are formed seats 25, Fig. 8, such seats being suitably shaped to receive portions of the pieces 4 4. Through the vertical walls of the said intermediate portion of the wax-containing chamber thread-passages 242 243 extend in line within the central bores or thread-passages 32 33 of the guide-tubes 3 31. When the pieces 4 4 are in place within the sockets 23 231, the longitudinal holes 41 41 of the said pieces occupy positions in line with the thread-passages 32, 242, 243, and 33.

In connection with each piece of rubber 4 or the like I employ a clip 5, engaging with such piece. The clip may vary more or less in form and construction in the application of the same to the wax-pot and in the manner and means of its adjustment. The chief essentials thereof are that it shall be constructed to engage with the piece 4, at least at the inner and the outer surfaces thereof, when in place in the socket of the wax-pot, that it shall be suitably constructed to apply pressure to the outer portion of the said piece to compress the latter against the seat 25, and that it shall be adjustable to enable the rubber to be compressed to the required degree with capacity for variation. In the present instance the clip is formed with an annular portion which encircles the piece of rubber and with lateral wings at one side thereof, forming a shoe 51, approximating in length to the length of the piece of rubber. At the side opposite the said shoe the clip is furnished with a projecting stem 52, which is passed through the hole 24 and projects from the boss 241 at the front side of the casing or shell of the wax-pot. The said stem is screw-threaded, and to the same is applied an adjusting-nut 53, which latter acts against the plane face of the boss 241. By means of the said nut and screw-threaded stem the clip may be adjusted to compress the piece 4 to a greater or less extent between the shoe 51 of the clip and the seat 25 of the casing or shell of the wax-pot. By reason of the fact that the ring-shaped portion of the clip engages with the piece 4 at the front or inner side thereof it follows that when it is desired to remove such piece from the socket all that is required is that the nut 53 should be unscrewed from the stem 52 of the clip, after which the latter may be pushed rearward from the socket, taking with it the piece 4. After the removal of the clip and piece 4 from the wax-pot the said piece may be driven out or ejected from the clip and a fresh one inserted into the latter, whereupon the clip may be restored to its place and the new piece caused to assume working position in the socket.

In practice the piece of rubber or other material which is employed in connection with each socket is of a proper length to enter readily within the same. When the clip is acted upon by means of the nut 53 to cause the shoe 51 to compress the said piece against the seat 25, the displacement of the material of the piece in the direction of its length which takes place causes the ends thereof to bear firmly against the end walls of the sockets around the passages 242 243, thereby insuring against escape of the contents of the wax-pot through such passages. The shoe 51 applies the pressure throughout substantially the entire length of the piece 4 at the outer side of the latter, thereby producing an even compression of the thread throughout the length of the said piece, causing the thread to be stripped effectively by the piece through which the thread passes in leaving the wax-pot with a less degree of compression and resulting tension. The curved shape of the seat 25 and shoe 51 causes converging pressure to be applied to all sides of the piece 4, such pressure practically being uniformly radial at all points and tending to reduce the diameter of the central hole 41 uniformly.

I claim as my invention—

1. In a thread-waxer, or the like, the combination with the wax-pot having the socket, and the compressible packing occupying such socket, of the movable clip engaging with the said material at the inner and outer sides thereof, operating to compress it within the said socket, and adapted to act in its movement to eject the same from the socket, and securing means for said clip.

2. In a thread-waxer, or the like, the combination with the wax-pot having the socket, and the compressible packing occupying such socket, of the movable clip engaging with the said packing at the inner and outer sides thereof, provided with the elongated shoe to act against the packing along the outer side of the latter, and adapted to act in its movement to eject the packing from the socket, and securing means for said clip.

3. In a thread-waxer, or the like, the combination with the wax-pot having the socket, and the piece of compressible packing occupying the said socket, of the clip clasping the said packing so as to engage with the same at the inner and outer sides thereof and provided with the screw-threaded stem, and the nut engaging with the said stem.

4. In a thread-waxer, or the like, the combination, the wax-pot having the sockets at opposite sides of an intermediate portion of its wax-containing chamber, and also having the thread-passages, the packing occupying the said sockets, the clips each clasping the corresponding portion of packing at the inner and outer sides thereof and adapted in its movement to act to eject the rubber from the sockets, and means to adjust the clips to compress the said packing within the sockets.

5. In a thread-waxer, or the like, the combination with a support having a seat or socket, and packing applied to the said seat or socket, of a clip for said packing, provided with means for securing the clip in place, and engaging with the packing at the inner side of the latter to unseat the packing upon the withdrawal of the clip.

6. In a thread-waxer, or the like, the combination with a support having a seat or socket, and packing applied to the said seat or socket, of a clip holding the packing in place and also engaging with the same at the inner side thereof to unseat the packing upon the withdrawal of the clip, and adjusting means for said clip.

In testimony whereof I affix my signature in presence of two witnesses.

FRANK W. MERRICK.

Witnesses:
CHAS. F. RANDALL,
WILLIAM A. COPELAND.